June 2, 1959 F. W. PIERCE ET AL 2,888,918
APPARATUS FOR TEMPERATURE DIFFERENCE DETECTION
Filed Sept. 2, 1953
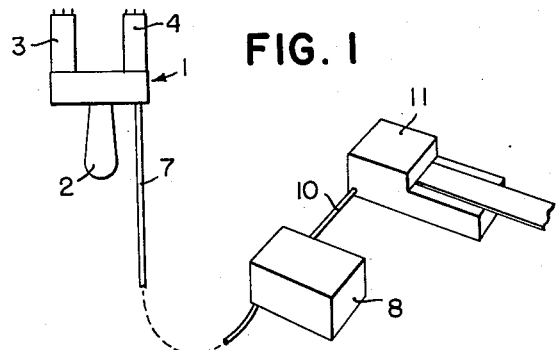
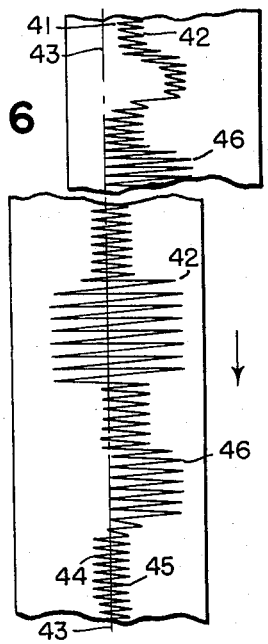
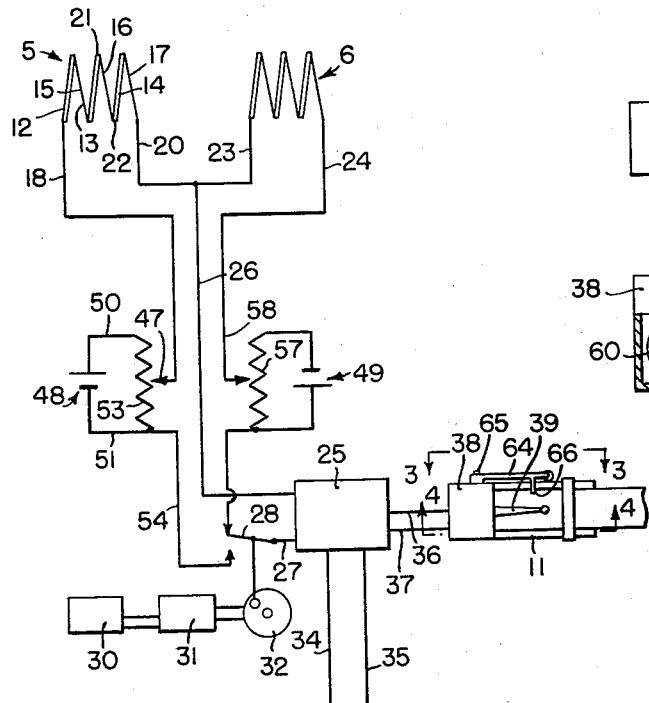
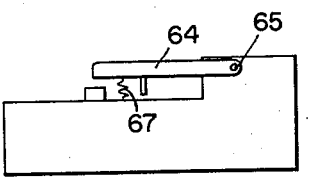
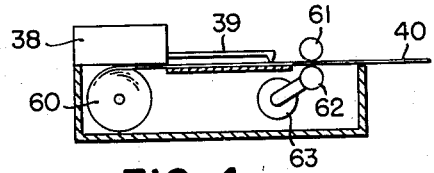
INVENTORS.
FRANKLIN W. PIERCE
WILLIAM A. WOEHR
BY
ATTORNEY

United States Patent Office 2,888,918
Patented June 2, 1959

2,888,918

APPARATUS FOR TEMPERATURE DIFFERENCE DETECTION

Franklin W. Pierce, Rock Island, and William A. Woehr, Moline, Ill., assignors to Blackhawk Instrument Company, Rock Island, Ill., a corporation of Illinois Application September 2, 1953, Serial No. 378,016

3 Claims. (Cl. 128—2)

The invention permits detecting variations in the temperatures of adjacent areas of a surface relative to each other. One application of the invention is adapted to detect variations in the temperature of adjacent areas of the human skin. In its preferred form the invention may be used to detect variations in the temperatures of local areas of a surface along each of two parallel paths from an arbitrarily selected base temperature and from each other. One form of the invention provides a graphic record showing side by side the variations of temperatures along each of two parallel paths extending across a surface.

The invention permits passing two feelers carried by a hand piece over the back on either side of the spine to detect and to locate high temperature areas regardless of whether the high temperature area embraces both feelers or not. Devices are now available which indicate the difference of temperatures under the two feelers—one feeler located on each side of the spine, which are in contact with the skin. Since these devices employ opposed thermopiles carried by the feelers, if the temperature on both sides of one vertebra are higher than alongside another vertebra, no indication of the higher temperature adjacent one vertebra will be given if the high temperature area is contacted by both feelers at the same time.

The current invention, by contrast, gives a running record of the temperatures under each feeler and will indicate a rise in temperature under one or both feelers.

An object of the invention is to provide means responsive to the differences of temperature above selected base temperatures under each of two feelers moving along parallel lines and providing a graphic record of these temperatures.

Another object of the invention is to draw on a moving chart two curves related to the same reference line, the distance of the curve at any given point from the reference line indicating the difference of the temperature of the point on the surface being investigated from some selected base temperature.

Another object of the invention is to show a graphic record of temperature variations under each of two feelers carried by a single handpiece by two curves having a common reference line and located on opposite sides thereof.

Another object is to detect "hot" areas on either or both sides of the spine.

Still another object is to provide a graphic record which will show the "hot" areas on either or both sides of a line extending across a surface.

While the invention is illustrated as applied to a chiropractor's detector which is adapted to be moved along the back of a patient in a manner to straddle the spine, it is understood that the invention is not limited to this particular application.

Fig. 1 shows the handpiece having two feelers and a recorder adapted to make a chart.

Fig. 2 shows the electric circuits diagrammatically.

Fig. 3 shows an elevation of the recorder taken along 3—3 in Fig. 2.

Fig. 4 shows the recorder partly in section taken along line 4—4 in Fig. 2.

Fig. 5 shows the strip of the recorder enlarged and showing a typical chart.

Fig. 6 shows an alternate type of chart.

The handpiece, generally indicated at 1, has a handle 2 and two feelers, 3, 4, adapted to be pressed against the surface. Each feeler carries means that cause a change in the amount of current flowing out of the feeler. In the form of the invention here shown, a thermopile is mounted in each feeler to create the potential which causes the current to flow. One end of each of the thermopiles 5, 6 projects from each of the feelers to contact the surface. A cable 7, may lead from these thermopiles on the handpiece to a housing 8 in which the signals transmitted through cable 7 are modified and magnified. These magnified signals are transmitted through a cable 10 to recorder 11. However, the housing 8 may be eliminated if the thermopile signals are strong enough.

Thermopile 5 consists of a number of metallic elements joined up in series, strips 12, 13, 14 being of one metal while the intervening strips 15, 16 and 17 are of another metal. The ends of the thermopile assembly are connected to lines 18, 20. When the end 21 of the thermopile is pressed against a surface that is at a different temperature than that of the other end 22, of the thermopile which is not in contact with the surface, an electric potential is generated, tending to cause current to flow in one direction proportional to the rise of temperature. It will be assumed, by way of illustration, that the metals in thermopile 5 are so arranged that a rise in the temperature of the end 21 will cause a positive current to flow out through line 18.

Thermopile 6 is similarly constructed and connects with lines 23, 24. In the preferred form thermopile 6 is so connected as to create a positive current flow in line 23 proportional to the rise in temperature of the surface with which thermocouple 6 is in contact. Lines 20 and 23 are here shown connected to the magnification unit 25 through a single line 26. Lines 18 and 24 are connected alternately but not simultaneously, to the other line 27 by the oscillating switch 28. This switch may be oscillated back and forth in any convenient manner. Thus the switch may be driven by a motor 30 through a speed reducer 31 which revolves a wheel 32 having an eccentric pin connected by a link with the switch.

It will be noted that as the switch oscillates, the current fed to unit 25 is reversed. Assuming that the ends of thermopiles 5 and 6 in contact with a surface are both warmer than the other ends of the thermopiles, with the switch in the position shown, a positive current will flow through line 26 while when the switch is in the other position a positive current will flow through line 27. This preferred form of the invention produces the type of chart shown in Fig. 5.

In an alternate form of the invention the thermopile 6 is reversed so that 24 is positive and 23 is negative. Then line 26 will always be negative and the switch 28, as it oscillates, connects line 27 to either the positive value of line 18 or the positive value of line 24. This produces the alternate type of chart shown in Fig. 6.

The current magnifying unit is a familiar device and need not be described in detail. Current is supplied from power lines 34, 35 to the magnifying unit which causes current to flow through lines 36, 37 in direct proportion to the current that it receives through lines 26 and 27. In the preferred form of the invention the current flowing through lines 36 and 37 will reverse each time the switch oscillates and is the type of chart shown in Fig. 5. The current is fed to a galvanometer 38, causing the pointer 39, which may carry a pen in contact with the chart strip 40, to swing alternately to the right and to the left of the central neutral position shown in the drawing.

As a result of the oscillation of pointer 39, a curve is drawn on the chart, having a series of loops 41, 42 of which are distant from the neutral line 43 an amount proportional to the intensity of current generated by the temperatures encountered by the feelers 3 and 4.

It will be noted that the significant line on the chart is the envelope that encloses the ends of the oscillations. Since the galvanometer arm will pause at each end of its swing as long as the switch is closed, the recorder can readily be adjusted so that the ends of the loops, forming the envelope, are more prominent than the intermediate portions of the swing.

If the thermopile 6 is reversed, the galvanometer will not cross the reference line but it will still alternately record the temperature under feeler 3 and 4. The type of chart shown in Figure 6 will result. The similar points on the two charts Figs. 5 and 6 carry the same number.

Where high temperatures are encountered on both sides of the spine, as at the spots corresponding to points 41, 42, the chart is symmetrical about line 43. Assume that the chart has moved from the recorder in the direction of the arrow in Fig. 5. The indication would be that at the points along the surface of the spine that correspond to 44, 45 temperatures are low and equal; that at 46 some disturbance is causing a high temperature to one side of the spine while at 41, 42 high temperatures are encountered at both sides of the center line.

In a chiropractic exploration, this indicates that a condition exists that needs attention but this could not be detected by the familiar type of detector in which the two thermopiles are opposed and only the difference of the temperatures on the two sides of the spine are indicated.

Since in the preferred form the pointer 39 of the galvanometer must oscillate alternately to one side and then to the other side of center line 43, means must be provided to limit the extent of these swings. These means comprise means for moving the base temperature above which the galvanometer records, up or down. This is done by connecting line 18 to a sliding contact 47. A direct current source, such as a battery 48 has a positive lead 50 and a negative lead 51. These two leads are connected to a resistance 53 along which slider 47 moves. Depending on the position of the slider, a larger or a smaller portion of the voltages of the thermopile 5 will be erased by the opposed current flowing from the battery 48. The modified current will flow through line 18 to line 54 that leads from one end of the resistance 53 to one of the contacts for switch 28.

A similar battery having the positive lead 55 and the negative lead 56 connects with a resistance 57 with which a slider 58 connected with lead 24 connects. Depending upon the position of the slider, more or less of the voltage of line 24 is absorbed and the voltage transmitted through line to the switch is correspondingly reduced. By moving the sliders 47 and 58, the swing of the galvanometer pointer to either side of the center line 43 may be controlled.

The recorder generally indicated at 11 may be of the conventional design having a roll of tape from which the tape 40 passes between two rollers 61, 62, one of which is driven at constant speed by a motor 63.

To enable the user to correlate the diagram with the particular locations of the field over which the handpiece 1 is moved, some device controlled by the operator for making a mark on the chart may be provided. Such a device is illustrated in Figures 2 and 3. This device may consist of an arm hinged at 65 and having a finger 66 adapted to make a mark on the chart strip 40 when the arm 64 is manually depressed against the force of spring 67 which tends to elevate the arm.

Thus if the device is used by a chiropractor and the handpiece is travelling along down the patient's back, the operator may press on arm 64 as the handpiece passes a particular vertebra which the chiropractor uses as a reference point. This will make a mark on the chart.

While the invention has been illustrated as applied to a chiropractor's detector, it is understood that the invention is not limited to this particular application and that there can be variations such as making a thermopile strong enough to actuate the galvanometer without a current magnifying unit. Furthermore, it is possible to use a single thermocouple on each side in place of the thermopiles mentioned above.

We claim:

1. A recorder adapted to create a chart on a moving strip by the oscillation of a galvanometer indicator in which the extent of the swing from a central reference line in one direction indicates the temperature at one point along one of two parallel lines and the swing in the other direction from the central reference line the temperature at a corresponding point along the other one of said lines, in combination, a holder having two feelers adapted to be placed in contact with a surface and moved along parallel lines on said surface, means in each feeler creating a current potential related to the temperature at the tip of the feeler, a galvanometer having an indicator with a normal position, a switch adapted in one position to connect the current potential from one feeler to said galvanometer so that the excess over a base temperature will move the indicator in one direction from said normal indicator position and in the other position to connect the current potential from the other feeler to said galvanometer that the excess over a base temperature will move the indicator in the other direction, a pen at the end of the indicator, a strip on which the movement of said indicator is recorded, means to move said strip and to oscillate said switch at a rate slow enough for the indicator to complete its swing in either direction in response to a current.

2. A recorder adapted to create a chart on a moving strip by the oscillation of a galvanometer indicator in which the extent of the swing from a central reference line in one direction indicates the temperature at one point along one of two parallel lines and the swing in the other direction from the central reference line the temperature at a corresponding point along the other one of said lines, in combination, a holder having two feelers adapted to be placed against a surface and to be moved along parallel lines on said surface, means in each feeler creating a current potential related to the temperature at the tip of the feeler, a galvanometer having an indicator with a normal position, a switch adapted in one position to connect the current potential from one feeler to said galvanometer so that the excess over a base temperature will move the indicator in one direction from said normal indicator-position and in the other position to connect the current potential from the other feeler to said galvanometer to move the indicator in the other direction, a pen at the end of the indicator, a strip on which the movement of said indicator is recorded, means to move said strip and to oscillate said switch and means that reduces the current potential by a fixed amount to reduce the amplitude of the movement of the galvanometer indicator.

3. A detector of variations in the temperature of various points on a surface relative to each other, comprising, in combination, two feelers, a thermopile carried by each feeler having one end in contact with a surface, a slider connected to one lead extending from the positive end of one thermopile, a resistance contacted by said slider, means to supply current flowing through said resistance to create a fixed voltage differential between the ends of said resistance, a primary line leading from the end of the resistance having a lower positive potential than said slider, a second slider connected to one lead extending from the negative end of the second thermopile, a second resistance contacted by said second slider, means to supply current flowing through said second resistance to create a fixed voltage differential between the ends of said second resistance, a second primary line leading from that end of the second resistance having a lower negative potential than said second slider, a potential recorder adapted to record positive and negative potential on a moving chart, a switch alternately connecting each of said primary lines to one terminal of said potential recorder, a single secondary line connected to the other end of each of said thermopiles and to the other terminal of said recorder and means to reciprocate said switch at short time intervals.

References Cited in the file of this patent

UNITED STATES PATENTS

| | | |
|---|---|---|
| 1,494,586 | Cary | May 20, 1924 |
| 1,982,053 | Hodgson et al. | Nov. 27, 1934 |
| 2,392,916 | Gruss | Jan. 15, 1946 |
| 2,425,080 | Blakeslee | Aug. 5, 1947 |
| 2,525,094 | Caldwell | Oct. 10, 1950 |
| 2,661,733 | Polsky | Dec. 8, 1953 |